United States Patent
Scharstuhl et al.

(10) Patent No.: US 6,899,809 B2
(45) Date of Patent: May 31, 2005

(54) WATER FILTERING DEVICE

(75) Inventors: Johan Jan Scharstuhl, Ambt-Delden (NL); Eric Scharstuhl, Enschede (NL)

(73) Assignee: Prime Water Systems GmbH, Bentheime (DE)

( * ) Notice: Subject to any disclaimer, the term of this patent is extended or adjusted under 35 U.S.C. 154(b) by 77 days.

(21) Appl. No.: 10/315,276

(22) Filed: Dec. 6, 2002

(65) Prior Publication Data

US 2003/0136724 A1 Jul. 24, 2003

Related U.S. Application Data

(63) Continuation of application No. PCT/NL01/00408, filed on May 25, 2001.

(30) Foreign Application Priority Data

Jun. 6, 2000 (NL) .............................. 1015384

(51) Int. Cl.⁷ ................................ C02F 9/00
(52) U.S. Cl. ................ 210/257.2; 210/260; 210/262; 210/266; 210/282; 210/295
(58) Field of Search ................ 210/257.2, 259, 210/266, 282, 314, 335, 484, 295, 321.88, 483, 260, 261, 262

(56) References Cited

U.S. PATENT DOCUMENTS

| | | | |
|---|---|---|---|
| 4,094,779 A | * | 6/1978 | Behrman .................... 210/694 |
| 4,441,996 A | | 4/1984 | Hurst et al. ................. 210/241 |
| 5,552,046 A | | 9/1996 | Johnston et al. ............ 210/266 |
| 5,595,659 A | | 1/1997 | Huang et al. ............ 210/502.1 |
| 5,895,573 A | | 4/1999 | Scharstuhl ............ 210/321.87 |
| 2001/0037964 A1 | * | 11/2001 | Won et al. .................. 210/120 |

FOREIGN PATENT DOCUMENTS

| | | |
|---|---|---|
| JP | 04326980 | 11/1992 |
| WO | WO99/48598 A1 | 9/1999 |

* cited by examiner

Primary Examiner—Ivars C. Cintins
(74) Attorney, Agent, or Firm—Peacock Myers & Adams PC; Jeffrey D. Myers

(57) ABSTRACT

A water filtering device suitable for locally, under atmospheric pressure, purifying contaminated water, and which comprises a container that is provided with an inlet opening and an outlet opening, which container is provided with at least: a preliminary filtration element for the removal of particles, if present, of a particle size more than 10 micrometers; a filtration element provided with activated charcoal; and an ultrafiltration element.

8 Claims, 1 Drawing Sheet

WATER FILTERING DEVICE

Figure 1:
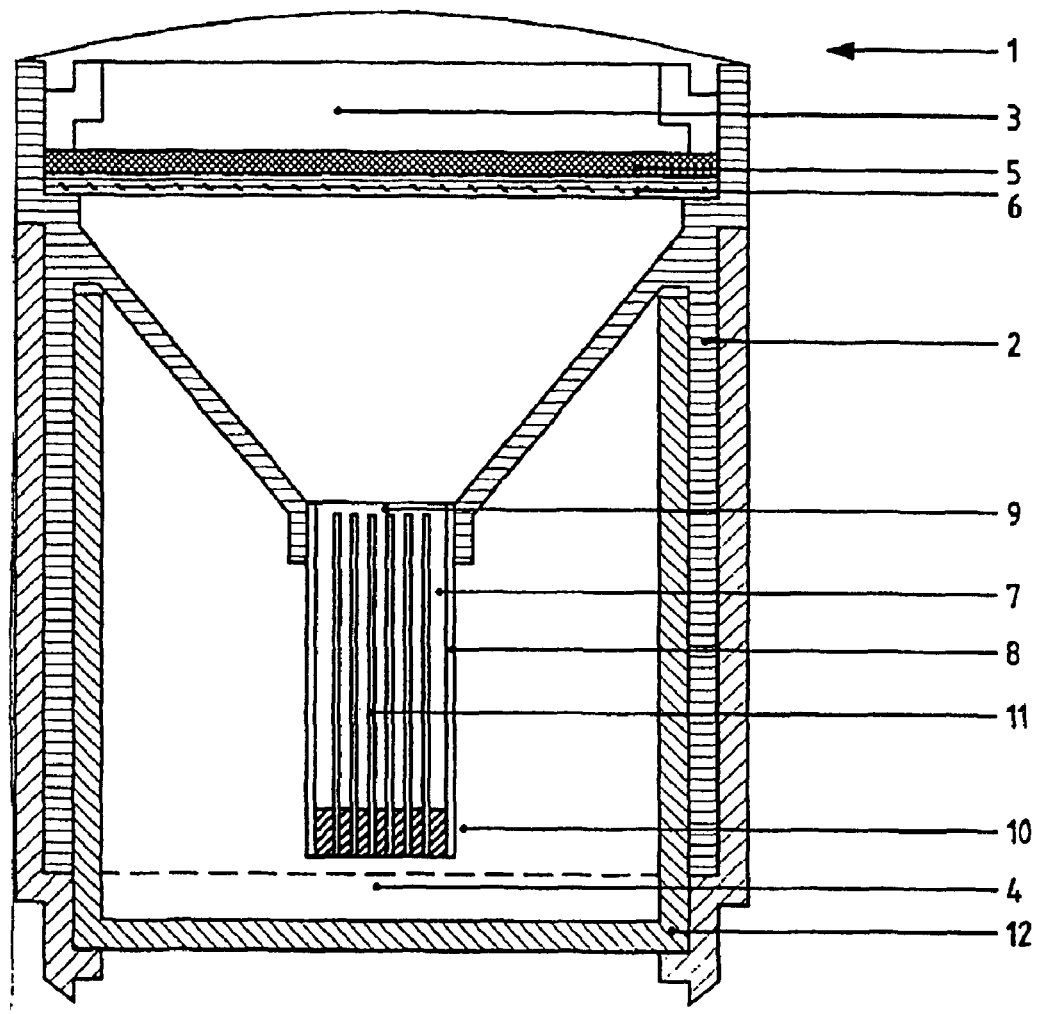

This application is a continuation of Application No. PCT/NL01/00408 entitled "Water Filtering Device", to Scharstuhl et al., filed on May 25, 2001, which claimed the benefit of the filing of The Netherlands Application No. NL 1015384 entitled "Water Filtering Device", to Scharstuhl et al., filed on Jun. 6, 2000.

The invention relates to a water filtering device.

Devices for the purification of liquids and more specifically for the purification of drinking water and for the removal therefrom of living microorganisms are known in practice. Usually the devices used for the purification of drinking water are large and have to cover an extensive area. Often dated techniques or old devices are used and it is consequently not easy to realize adequate purification of drinking water. Also, it is possible that pathogens such as bacteria and viruses or other kinds of contamination such as sediment and organic compounds, either or not in solution, and salts appear later on in the water that was initially purified. In many cases, chlorine is added to the drinking water to prevent the occurrence of health-threatening contamination. This has the considerable disadvantage that the taste and smell of the water deteriorate significantly. A number of microorganisms such as *Cryptosporidium* and *Giardia* are moreover resistant to chlorine and thus stay alive in chlorinated drinking water. Furthermore, the fact that in many areas, and in particular in Third World countries, there is absolutely no reliable drinking-water supply, is problematic.

It is an object of the present invention to solve the above mentioned problem and to provide a water filtering device that is able, under atmospheric pressure, to make drinking water from contaminated water.

It is a further object of the present invention to provide such a water filtering device of a design such as to make it easy to realize, thereby making it possible to locally purify water at low costs, especially in those areas where there is no reliable drinking-water supply.

This objective is achieved in accordance with the present invention with a water filtering device, characterized in that the water filtering device is suitable for locally, under atmospheric pressure, purifying contaminated water, and which comprises a container that is provided with an inlet opening and an outlet opening, which container is provided with at least:

a preliminary filtration element for the removal of particles, if present, of a particle size >10 $\mu$m;

a filtration element provided with activated charcoal; and an ultrafiltration element.

As will be demonstrated by a way of example in the drawing and in the exemplary embodiment, the invention provides a surprisingly simple, yet very effective water filtering device with which drinking water of a good quality can be obtained.

According to a preferred embodiment of the water filtering device of the present invention, the preliminary filtration element is a flat asymmetrical filter having a non-uniform pore size distribution, which is positioned in such a way that when in use, the water stream flows from large to small pores.

Such a preliminary filtration element effectively removes particles that could clog the ultrafiltration element. Such an asymmetrical filter may, for example, have pores at one side of approximately 50 $\mu$m and at the other side, pores of approximately 10 $\mu$m.

Favourable results are obtained if the thickness of the preliminary filtration element lies in the range from 1–10 mm.

The preliminary filtration element is preferably comprised of a composite of hydrophilic materials.

The combination of the permanently hydrophilic membranes and the asymmetrical pore structure results in little pressure difference being needed over the membrane, while realizing a high filtration/permeate yield, that is to say, a high capacity is realized at a low operating pressure.

In accordance with a further preferred embodiment of the water filtering device according to the invention, the filtration element comprising the activated charcoal is composed of a layer of activated charcoal on a carrier material.

When the effectiveness of the filtration element provided with the activated charcoal is diminished due to the already adsorbed contamination, it is thus easy to replace with a new one.

It is especially preferable for the preliminary filtration element and the filtration element comprising the activated charcoal to be combined into a sandwich structure.

On the one hand this facilitates the replacement of the filter elements, and on the other hand, the use of the sandwich structure allows sediment and the like to be filtered out and organic compounds to be adsorbed in one step.

In accordance with a very convenient preferred embodiment of the water filtering device according to the invention, the ultrafiltration element comprises a filter housing provided with an inlet and an outlet connection in which a bundle of capillary ultrafiltration membranes is provided, which are open at a first end and closed at another end, and which at the first end are set in a membrane holder that seals off the gap between the capillary ultrafiltration membranes and the filter housing, the capillary ultrafiltration membranes having an asymmetrical pore structure, such that the pore structure is gradually reduced in the stream direction of the liquid stream through the membrane wall.

This ultrafiltration element provides good filtration at atmospheric pressure in conjunction with high capacity.

The effectiveness and applicability of the water filtering device is further improved if the ultrafiltration membranes are permanently hydrophilic. Combining permanently hydrophilic membranes and asymmetrical pore structure results in little pressure difference being needed over the membrane at a high filtration/permeate yield, that is to say a high capacity is achieved at a low operating pressure.

It is remarked that a water filtering device comprising an ultrafiltration membrane and having an asymmetrical pore structure is in itself known from the Dutch patent application NL-A-1004210. However, this does not relate to a three-step water filtering device such as according to the present invention.

By referring to the above-mentioned Dutch patent application NL-A-1004210, the contents thereof are deemed to be included herein.

According to a further embodiment, the outlet opening of the water filtering device is connected to a storage reservoir.

This is a simple manner to prevent the water that was purified just previously, and that is not being used immediately after purification, from becoming contaminated.

The invention will now be further elucidated with reference to a drawing, showing in:

FIG. 1 a front view of a water filtering device according to the present invention.

FIG. 1 shows a three-step water filtering device according to the present invention. The water filtering device 1 comprises a container 2 that is provided with an inlet opening 3 and an outlet opening 4. In the embodiment shown, the container 2 is provided with three filtration elements 5, 6 and 7, to wit a preliminary filtration element 5 for the removal of possibly present particles having a size >10 μm; a filtration element 6 that is provided with activated charcoal; and an ultrafiltration element 7.

In the embodiment shown, the filtration elements 5 and 6 are arranged into a sandwich structure, allowing the filtration of sediment and absorption of organic compounds present in the water to be purified, to be realized in one step.

The removal of bacteria and viruses present in the water to be purified takes place at the ultrafiltration element 7. The ultrafiltration element 7 is mounted in the container 2 and comprises a filter housing 8 that is provided with an inlet connection 9 and an outlet connection 10 which, in the embodiment shown, connects to the outlet opening 4. In the filter housing 8, a bundle of capillary ultrafiltration membranes 11 is provided, which are open at a first end (at inlet connection 9) and closed at the other end. At the first end the capillary ultrafiltration membranes 11 are set in a membrane holder that seals the gap between the capillary ultrafiltration membranes 11 and the filter housing 8, the capillary ultrafiltration membranes having an asymmetrical pore structure, such that the pore structure is gradually reduced in the stream direction of the liquid stream through the membrane wall. The capillary membranes 11 have a very open asymmetrical pore structure, the pore size at the external wall being, for example, approximately 1–2 μm and the pore size at the interior wall being, for example, approximately 0.02 μm. As with the preliminary filtration element 5, the pore size decreases in the stream direction of the water through the membrane wall. For a further elucidation on the ultrafiltration element 7, reference is made to the above-mentioned Dutch patent application NL-A-1004210, which is deemed to be included herein by reference.

The outlet opening 4 of the water filtering device 1 is connected to a storage reservoir 12 that serves as collecting receptacle for the purified water.

The filtering device 1 has a very simple construction and is easy to disassemble for the purpose of, for example, replacing spent filtration elements 5, 6, 7.

Also, the filtering device 1 can be stored and transported in parts and may be assembled just prior to use to thus obtain the filtering device according to the invention.

The invention will now be further elucidated by means of an exemplary embodiment.

EXAMPLE

Approximately 10 liters of water from which first the largest pieces of debris such as twigs and the like were removed, were poured onto the inlet opening 3 of the water filtering device 1 referred to in the drawing. The water column that had developed above the sandwich filter (filtration elements 5 and 6) provided sufficient pressure to start the filtration process.

Particles having a size of >10 μm were filtered out by the sandwich filter, and dissolved organic compounds were adsorbed by the layer of activated charcoal. The water that had undergone preliminary filtration trickled into the space under the sandwich filter and trickled into the ultrafiltration element 7. As the flow rate of the sandwich filter was greater than that of the ultrafiltration element 7, the space above it filled gradually. The resulting water column again provided sufficient water pressure to start the ultrafiltration process. The thus purified water trickled into the collecting receptacle 12, and was ready for consumption.

The present invention is not limited to the non-limiting embodiment as described in the drawing and in the exemplary embodiment. Within the scope of the appended claims the same may be varied in numerous ways.

What is claimed is:

1. A water filtering device comprising a container that is provided with an inlet opening and an outlet opening, which container is provided with at least:

a hydrophilic preliminary filtration element for removal of particles, if present, of a particle size more than 10 micrometers;

a filtration element provided with activated charcoal; and an ultrafiltration element; and wherein the preliminary filtration element and the filtration element comprising the activated charcoal are combined into a sandwich structure; and wherein the water filtering device purifies water under atmospheric pressure.

2. A water filtering device according to claim 1, wherein the preliminary filtration element is a flat asymmetrical filter having a non-uniform pore size distribution, which is positioned in such a way that when in use, the water stream flows from large to small pores.

3. A water filtering device according to claim 1, wherein the preliminary filtration element has a thickness ranging from 1–10 micrometers.

4. A water filtering device according to claim 1, wherein the preliminary filtration element is comprised of a composite of hydrophilic materials.

5. A water filtering device according to claim 1, wherein the water filtration element comprising the activated charcoal is composed of a layer of activated charcoal on a carrier material.

6. A water filtering device according to claim 1, wherein the ultrafiltration element comprises a filter housing provided with an inlet and an outlet connection in which a bundle of capillary ultrafiltration membranes is provided, which are open at a first end and closed at another end, and which at the first end are set in a membrane holder that seals off the gap between the capillary ultrafiltration membranes and the filter housing, the capillary ultrafiltration membranes having an asymmetrical pore structure, such that the pore structure is gradually reduced in the stream direction of the liquid stream through the membrane wall.

7. A water filtering device according to claim 6, wherein the ultrafiltration membranes are permanently hydrophilic.

8. A water filtering device according to claim 1, wherein the outlet opening of the water filtering device is connected with a storage reservoir.

* * * * *